(12) United States Patent
Fecant et al.

(10) Patent No.: US 8,361,427 B2
(45) Date of Patent: Jan. 29, 2013

(54) IZM-3 CRYSTALLINE SOLID AND A PROCESS FOR ITS PREPARATION

(75) Inventors: Antoine Fecant, Brignais (FR); Nicolas Bats, Feyzin (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 233 days.

(21) Appl. No.: 12/744,627

(22) PCT Filed: Oct. 17, 2008

(86) PCT No.: PCT/FR2008/001457
§ 371 (c)(1),
(2), (4) Date: Sep. 7, 2010

(87) PCT Pub. No.: WO2009/090336
PCT Pub. Date: Jul. 23, 2009

(65) Prior Publication Data
US 2011/0009632 A1    Jan. 13, 2011

(30) Foreign Application Priority Data

Nov. 26, 2007 (FR) .................................. 07 08297

(51) Int. Cl.
*C01B 33/20* (2006.01)
*C07F 7/30* (2006.01)

(52) U.S. Cl. ........... 423/326; 546/11; 423/341; 423/704
(58) Field of Classification Search .................. 423/326, 423/341, 704; 546/11
See application file for complete search history.

(56) References Cited

U.S. PATENT DOCUMENTS

| 4,539,193 A | 9/1985 | Valyocsik |
| 4,557,919 A * | 12/1985 | Sumitani et al. ............. 423/708 |

FOREIGN PATENT DOCUMENTS

| WO | 9829339 A | 7/1998 |
| WO | PCTFR0801457 R | 6/2009 |

* cited by examiner

*Primary Examiner* — Charanjit Aulakh
(74) *Attorney, Agent, or Firm* — Millen, White, Zelano & Branigan, P.C.

(57) ABSTRACT

A crystalline solid designated IZM-3 is described which has the X ray diffraction diagram given below. Said solid has a chemical composition expressed as the anhydrous base in terms of moles of oxides by the formula $aSiO_2: bYO_2: cR: dF$, in which Y represents at least one tetravalent element other than silicon, R represents at least one organic nitrogen-containing species, particularly 1,5-bis(methylpiperidinium) pentane, and F is fluorine, a, b, c and d respectively representing the number of moles of $SiO_2$, $YO_2$, R and F and a is in the range 0.1 to 1, b is in the range 0 to 0.9, c is in the range 0.01 to 0.5 and d is in the range 0 to 0.5.

13 Claims, 1 Drawing Sheet

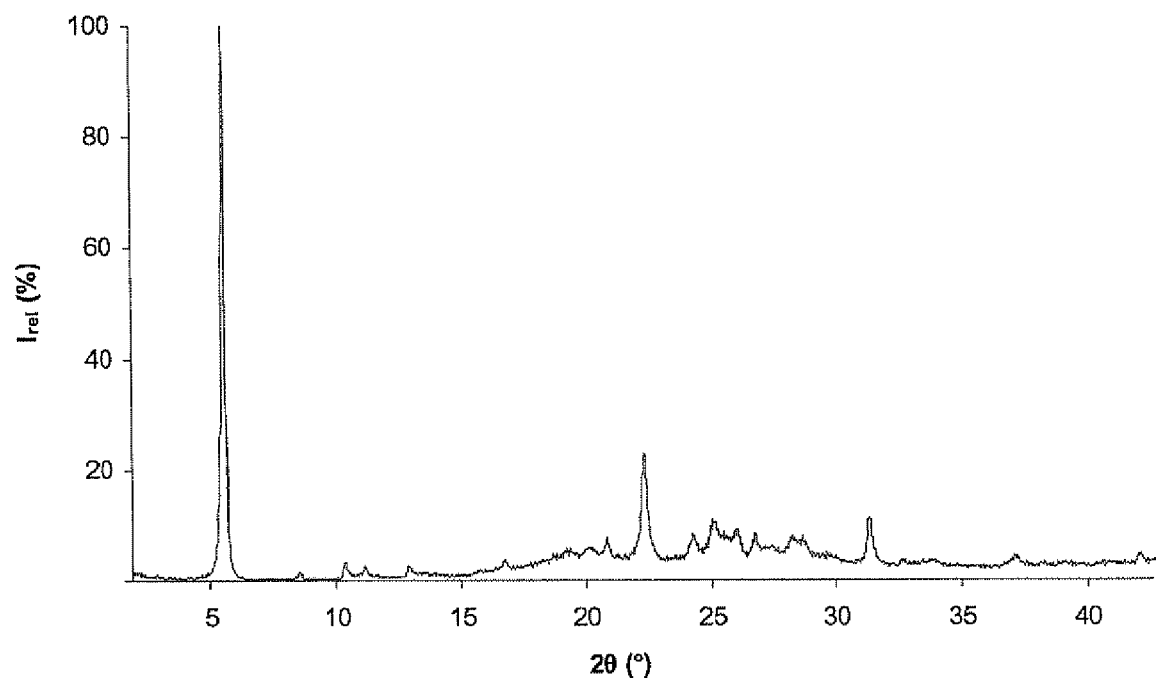

IZM-3 CRYSTALLINE SOLID AND A PROCESS FOR ITS PREPARATION

TECHNICAL FIELD

The present invention relates to a novel microporous crystalline solid hereinafter termed IZM-3, and to a process for preparing said solid.

PRIOR ART

Microporous crystalline materials such as zeolites or silicoaluminophosphates are solids which are widely used in the oil industry as catalysts, catalyst supports, adsorbants or separation agents. Although many microporous crystalline structures have been discovered, the refining and petrochemicals industry is constantly seeking out novel crystalline structures which have particular properties for applications such as purification or separation of gas, or the conversion of carbonaceous or other species.

Zeolites occupy a major place among crystalline structures. Of the zeolites synthesized over the last forty years, a certain number of solids have allowed significant progress to be made in the fields of adsorption and catalysis. Examples of these which may be cited are Y zeolite (U.S. Pat. No. 3,130,007) and ZSM-5 zeolite (U.S. Pat. No. 3,702,886). The number of novel molecular sieves, including zeolites, synthesized each year is constantly increasing. A more complete description of the various molecular sieves which have been discovered can be obtained by referring to the following work: "Atlas of Zeolite Framework Types", Ch Baerlocher, W M Meier and D H Olson, Fifth Revised Edition, 2001, Elsevier. The following may be cited: NU-87 zeolite (U.S. Pat. No. 5,178,748), MCM-22 zeolite (U.S. Pat. No. 4,954,325) or gallophosphate (cloverite) with structure type CLO (U.S. Pat. No. 5,420,279) or the following zeolites: ITQ-12 (U.S. Pat. No. 6,471,939), ITQ-13 (U.S. Pat. No. 6,471,941), CIT-5 (U.S. Pat. No. 6,043,179), ITQ-21 (WO-02/092511), ITQ-22 (Corma A et al, Nature Materials 2003, 2, 493), SSZ-53 (Burton A et al, Chemistry: A Eur. Journal 2003, 9, 5737), SSZ-59 (Burton A et al, Chemistry: A Eur. Journal 2003, 9, 5737), SSZ-58 (Burton A et al, J Am Chem Soc 2003, 125, 1633) and UZM-5 (Blackwell, C S et al, Angew Chem, Int Ed, 2003, 42, 1737).

Several of the zeolites cited above have been synthesized in a fluoride medium, in which the mobilizing agent is not the usual hydroxide ion but the fluoride ion, using a process initially described by Flanigen et al (U.S. Pat. No. 4,073,865) then developed by J-L Guth et al (Proc Int Zeol Conf Tokyo 1986, p 121). The pHs of the synthesis media are typically close to neutrality. One of the advantages of such fluorinated reaction systems is that it allows purely silicic zeolites containing fewer defects to be obtained than the zeolites obtained in the traditional OH⁻ medium (J M Chézeau et al, Zeolites, 1991, 11, 598). Another decisive advantage linked to the use of fluorinated reaction media is that novel topologies for the silicic framework containing double rings with four tetrahedra (D4R) can be obtained, as is the case for ITQ-7, ITQ-12 and ITQ-13 zeolites. Further, the joint use of sources of germanium and silicon in the synthesis media may also allow novel frameworks of that type to be produced, i.e. containing D4R units, both in a conventional non-fluorinated basic medium and in a fluorinated medium, as is the case for ITQ-17 and ITQ-21 zeolites (A Corma et al, Chem Commun 2001, 16, 1486, Chem Commun 2003, 9, 1050) or IM-12 (J-L Paillaud et al, Science, 2004, 304, 990).

DESCRIPTION OF THE INVENTION

The present invention concerns a novel crystalline solid termed an IZM-3 crystalline solid, having a novel crystalline structure. Said solid has a chemical composition expressed as the anhydrous base in terms of moles of oxides by the following general formula: $aSiO_2:bYO_2:cR:dF$, in which Y represents at least one tetravalent element other than silicon, R represents at least one organic nitrogen-containing species, and F is fluorine, a, b, c and d respectively representing the number of moles of $SiO_2$, $YO_2$, R and F and a is in the range 0.1 to 1, b is in the range 0 to 0.9, c is in the range 0.01 to 0.5 and d is in the range 0 to 0.5.

The IZM-3 crystalline solid of the invention has an X ray diffraction diagram which includes at least the peaks set out in Table 1. This novel IZM-3 crystalline solid has a novel crystalline structure.

This diffraction diagram is obtained by radiocrystallographic analysis using a diffractometer employing the conventional powder technique with the $K_{\alpha 1}$ peak of copper ($\lambda=1.5406$ Å). From the position of the diffraction peaks represented by the angle $2\theta$, the characteristic interplanar spacings $d_{hkl}$ of the sample are calculated using the Bragg relationship. The error estimation $\Delta(d_{hkl})$ in the measurement of $d_{hkl}$ is calculated by the Bragg relationship as a function of the absolute error $\Delta(2\theta)$ in the measurement of $2\theta$. An absolute error $\Delta(2\theta)$ of $\pm 0.02°$ is normally acceptable. The relative intensity $I_{rel}$ in each value of $d_{hkl}$ is measured from the height of the corresponding diffraction peak. The X ray diffraction diagram of the IZM-3 crystalline solid of the invention comprises at least the peaks at values of $d_{hkl}$ given in Table 1. In the $d_{hkl}$ column, the mean values of the interplanar spacings are shown in Angstroms (Å). Each of these values must be supplemented by an error measurement $\Delta(d_{hkl})$ between $\pm 0.6$ Å and $\pm 0.01$ Å.

TABLE 1

Mean values of $d_{hkl}$ and relative intensities measured on an X ray diffraction diagram of the as-synthesized IZM-3 crystalline solid

| 2 theta (°) | $d_{hkl}$ (Å) | $I_{rel}$ |
|---|---|---|
| 5.59 | 15.80 | Vs |
| 8.56 | 10.32 | Vw |
| 10.36 | 8.53 | Vw |
| 11.16 | 7.92 | Vw |
| 12.93 | 6.84 | Vw |
| 13.56 | 6.53 | Vw |
| 15.79 | 5.61 | Vw |
| 16.77 | 5.28 | Vw |
| 18.70 | 4.74 | Vw |
| 19.20 | 4.62 | Vw |
| 20.15 | 4.40 | Vw |
| 20.87 | 4.25 | Vw |
| 22.37 | 3.97 | W |
| 24.29 | 3.66 | Vw |
| 25.09 | 3.55 | Vw |
| 26.00 | 3.42 | Vw |
| 26.73 | 3.33 | Vw |
| 27.40 | 3.25 | Vw |
| 28.17 | 3.16 | Vw |
| 28.61 | 3.12 | Vw |
| 29.74 | 3.00 | Vw |
| 31.31 | 2.85 | Vw |
| 32.62 | 2.74 | Vw |
| 33.86 | 2.65 | Vw |
| 37.10 | 2.42 | Vw |
| 38.18 | 2.36 | Vw |

TABLE 1-continued

Mean values of $d_{hkl}$ and relative intensities measured on an X ray diffraction diagram of the as-synthesized IZM-3 crystalline solid

| 2 theta (°) | $d_{hkl}$ (Å) | $I_{rel}$ |
|---|---|---|
| 42.09 | 2.15 | Vw | in which:
Vs = very strong;
S = strong;
M = medium;
Mw = medium weak;
W = weak;
Vw = very weak.

The relative intensity $I_{rel}$ is given with respect to a relative intensity scale where a value of 100 is attributed to the most intense peak in the X ray diffraction diagram: Vw<15; 15≦W<30; 30≦Mw<50; 50≦M<65; 65≦S<85; Vs≧85.

The IZM-3 crystalline solid of the invention has a novel basic crystalline structure or topology which is characterized by its X ray diffraction diagram given in FIG. 1. FIG. 1 was established using an IZM-3 crystalline solid in its as-synthesized form.

Said IZM-3 solid has a chemical composition expressed as the anhydrous base in terms of moles of oxides defined by the following general formula: $aSiO_2:bYO_2:cR:dF$, in which Y represents at least one tetravalent element other than silicon, R represents at least one organic nitrogen-containing species, and F is fluorine. In said formula given above, a represents the number of moles of $SiO_2$ and is in the range 0.1 to 1, preferably in the range 0.5 to 1 and highly preferably in the range 0.8 to 0.99, b represents the number of moles of $YO_2$ and is in the range 0 to 0.9, preferably in the range 0 to 0.5 and highly preferably in the range 0.01 to 0.2; c represents the number of moles of R and is in the range 0.01 to 0.5, preferably in the range 0.01 to 0.2 and highly preferably in the range 0.02 to 0.05; d represents the number of moles of F and is in the range 0 to 0.5, preferably in the range 0 to 0.2 and highly preferably in the range 0.01 to 0.05.

In accordance with the invention, Y is preferably selected from germanium, titanium, tin and a mixture of at least two of these tetravalent elements; more preferably, Y is germanium. R is an organic nitrogen-containing species comprising at least one quaternary nitrogen atom; preferably, R comprises two quaternary nitrogen atoms and highly preferably, R is 1,5-bis(methylpiperidinium)pentane the developed formula for which is given below. F is fluorine.

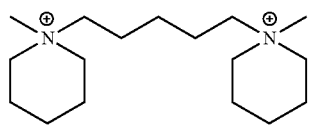 [SMILES: C[N+]1(CCCCC[N+]2(C)CCCCC2)CCCCC1]

When the silicon is present as a mixture with an element Y, the IZM-3 crystalline solid of the invention is then a crystalline metallosilicate having an X ray diffraction diagram which is identical to that described in Table 1 when it is in its as-synthesized form. When Y is germanium, the IZM-3 crystalline solid of the invention is a crystalline germanosilicate with an X ray diffraction diagram identical to that described in Table 1 when it is in its as-synthesized form. In the absence of an element Y in the composition of the IZM-3 crystalline solid of the invention, it is an entirely silicic solid which is then a crystalline silicate with an Xray diffraction diagram identical to that described in Table 1 when it is in its as-synthesized form.

More generally, said IZM-3 crystalline solid in its as-synthesized form has a chemical composition expressed by the following general formula: $aSiO_2:bYO_2:cR:dF:eH_2O$ (I), in which R represents an organic nitrogen-containing species comprising at least one nitrogen atom, Y represents at least one tetravalent element other than silicon; F is fluorine; a, b, c, d and e respectively represent the number of moles of $SiO_2$, $YO_2$, R, F and $H_2O$ and a is in the range 0.1 to 1, preferably in the range 0.5 to 1 and highly preferably in the range 0.8 to 0.99, b is in the range 0 to 0.9, preferably in the range 0 to 0.5 and highly preferably in the range 0.01 to 0.2, c is in the range 0.01 to 0.5, preferably in the range 0.01 to 0.2 and highly preferably in the range 0.02 to 0.05, d is in the range 0 to 0.5, preferably in the range 0 to 0.2 and highly preferably in the range 0.01 to 0.05 and e is in the range 0 to 2, preferably in the range 0.01 to 0.5.

In its as-synthesized form, i.e. directly from synthesis and prior to any step for extracting a nitrogen-containing organic species which is well known to the skilled person, said IZM-3 solid comprises at least the organic nitrogen-containing species R having at least one quaternary nitrogen atom as described below, or its decomposition products, or precursors thereof. In a preferred mode of the invention, in formula (I) above, the element R is 1,5-bis(methylpiperidinium)pentane.

The present invention also concerns a process for preparing an IZM-3 crystalline solid in accordance with the invention in which the following are reacted: an aqueous mixture comprising at least one source of silicon, optionally at least one source of at least one oxide $YO_2$, at least one organic nitrogen-containing species R comprising at least one quaternary nitrogen atom, at least one source of fluorine, the mixture preferably having the following molar composition:

$SiO_2/YO_2$: at least 0.1, preferably at least 1, more preferably 3 to 100;
$H_2O/(SiO_2+YO_2)$: 1 to 100, preferably 10 to 70, more preferably 20 to 50;
$R/(SiO_2+YO_2)$: 0.02 to 2, preferably 0.1 to 1;
$F/(SiO_2+YO_2)$: 0.01 to 4, preferably 0.02 to 2, more preferably 0.1 to 2.

where Y is one or more tetravalent element(s) selected from the group formed by the following elements: germanium, titanium, tin, preferably germanium, and where F is fluorine.

In accordance with the process of the invention, R is an organic nitrogen-containing species containing at least one quaternary nitrogen atom; preferably, R comprises two quaternary nitrogen atoms, acting as an organic template. Preferably, R is the nitrogen-containing compound 1,5-bis(methylpiperidinium)pentane. The anions associated with the quaternary ammonium cations present in the organic species template for the synthesis of the IZM-3 crystalline solid of the invention are selected from the acetate anion, the sulphate anion, the carboxy late anion, the tetrafluoroborate anion, halide anions such as the fluoride, the chloride, the bromide, the iodide, the hydroxide anion and a combination of several of these. Preferably, the anions associated with the quaternary ammonium cations present in the template species for synthesis of the IZM-3 crystalline solid are selected from the hydroxide anion and the bromide anion; more preferably, it is the hydroxide ion. Said organic nitrogen-containing species used as the template for the IZM-3 crystalline solid is synthesized using any method which is known to the skilled person. For the synthesis of the 1,5-bis(methylpiperidinium)pentane dibromide, one mole of 1,5-dibromopentane is mixed with at least 2 moles of N-methylpiperidine in ethanol. Generally, the mixture is heated under reflux for a period in the range 1 to 10 hours. After filtration, precipitation using an etherified solvent such as diethylether then re-crystallization from an ethanol/ether mixture, 1,5-bis(methylpiperidinium)pentane dibromide is obtained. The 1,5-bis(methylpiperidinium)pentane dihydroxide is preferably obtained by treatment at ambient temperature of an aqueous solution of the 1,5-bis(methylpiperidinium)pentane dibromide using silver oxide, $Ag_2O$.

The source of silicon used to carry out the process for preparing IZM-3 crystalline solid may be any compound comprising silicon and which can liberate that element in aqueous solution in the reactive form. The source of silica may be any one of those currently used in synthesizing zeolites, for example solid powdered silica, silicic acid, colloidal silica, dissolved silica or tetraethoxysilane (TEOS). Of the powdered silicas, it is possible to use precipitated silicas, in particular those obtained by precipitation from a solution of an alkali metal silicate, such as aerosil silicas, pyrogenic silicas, for example "CAB-O-SIL", and silica gels. It is possible to use colloidal silicas having different particle sizes, for example with a mean equivalent diameter in the range 10 to 15 nm or between 40 and 50 nm, such as those sold under trade names such as "LUDOX". Preferably, the silicon source is LUDOX-AS-40.

The source of element Y which may optionally be used to carry out the process for preparation of the IZM-3 crystalline solid may be any compound comprising the element Y which can liberate that element in aqueous solution in the reactive form. In the preferred case in which Y is germanium, the source of germanium is preferably amorphous germanium oxide. In the case in which Y is titanium, the source of titanium is advantageously selected from titanium acetate $Ti(CH_3CO_2)_4$, titanium ethoxide $Ti(OC_2H_5)_4$, titanium isopropoxide $Ti(OCH(CH_3)_2)_4$ and amorphous titanium oxide, $TiO_2$. In the case in which Y is tin, the source of tin is advantageously selected from tin acetate $Sn(CH_3CO_2)_4$ and amorphous tin oxide, $SnO_2$.

The fluorine may be introduced in the form of alkali metal or ammonium salts, for example NaF, $NH_4F$, $NH_4HF_2$ or in the form of hydrofluoric acid or in the form of a hydrolysable compound which can liberate fluoride anions in water, such as silicon fluoride $SiF_4$ or ammonium fluorosilicate $(NH_4)_2SiF_6$ or sodium fluorosilicate, $Na_2SiF_6$. Preferably, the source of fluorine is hydrofluoric acid.

In order to carry out the process for preparing the IZM-3 solid of the invention, it is preferable that the aqueous mixture comprising at least one source of silicon, optionally at least one source of at least one oxide $YO_2$, at least one source of fluorine, at least one organic nitrogen-containing species R containing at least one quaternary nitrogen atom, also comprises at least one source of hydroxide ions. Said source of hydroxide ions advantageously derives from the organic template species R when it is in the hydroxide form, for example when R is 1,5-bis(methylpiperidinium)pentane dihydroxide.

Additionally, in accordance with a preferred implementation of the process of the invention, an aqueous mixture comprising an oxide of silicon, optionally an oxide of germanium, hydrofluoric acid and 1,5-bis(methylpiperidinium) pentane dihydroxide, is reacted.

The process of the invention consists of preparing an aqueous reaction mixture known as a gel and comprising at least one source of silicon oxide $SiO_2$, optionally at least one source of at least one oxide $YO_2$, at least one source of fluorine and at least one organic nitrogen-containing species R. The quantities of said reagents are adjusted so as to provide said gel with a composition allowing it to crystallize into the IZM-3 crystalline solid in the as-synthesized form with general formula (I): $aSiO_2:bYO_2:cR:dF:eH_2O$, where a, b, c, d and e satisfy the criteria defined above. Next, the gel undergoes a hydrothermal treatment until the IZM-3 crystalline solid is formed. The gel is advantageously subjected to hydrothermal conditions under autogenous reaction pressure, optionally by adding gas, for example nitrogen, at a temperature in the range 120° C. to 200° C., preferably in the range 140° C. to 180° C., and more preferably in the range 160° C. to 175° C. until IZM-3 solid crystals in the as-synthesized form are formed. The time necessary to obtain crystallization generally varies between 1 hour and several months depending on the composition of the reagents in the gel, stirring and the reaction temperature. Preferably, the crystallization period is in the range 2 to 21 days, more preferably in the range 5 to 14 days. The reaction is generally carried out with stirring or in the absence of stirring, preferably in the presence of stirring.

It may be advantageous to add seeds to the reaction mixture to reduce the time necessary for the formation of crystals and/or to reduce the total crystallization period. It may also be advantageous to use seeds to encourage the formation of IZM-3 crystalline solid, to the detriment of impurities. Such seeds comprise solid crystals, preferably crystals of IZM-3 solid. The crystalline seeds are generally added in a proportion in the range 0.01% to 10% by weight of the mass of $SiO_2+YO_2$ oxides used in the reaction mixture.

At the end of the hydrothermal treatment step resulting in crystallization of the IZM-3 solid, the solid phase is filtered, washed then dried.

At the end of said drying step, the IZM-3 solid obtained is preferably freed of water and is that with an X ray diffraction diagram including at least the peaks set out in Table 1.

After extracting the organic nitrogen-containing species R, the IZM-3 crystalline solid of the invention is advantageously used as an adsorbant to control pollution or as a molecular sieve for separation or again as an adsorbant.

When it is used as an adsorbant, said solid is generally dispersed in an inorganic matrix phase which contains channels and cavities which allow the fluid to be separated access to the crystalline solid. These matrices are preferably mineral oxides, for example silicas, aluminas, silica-aluminas or clays. The matrix generally represents 2% to 25% of the mass of the adsorbant thus formed.

DESCRIPTION OF FIGURE

FIG. 1 is a diffraction diagram as discussed in Examples 3, 4 and 5.

The invention is illustrated in the following examples which are not in any way limiting in nature.

EXAMPLE 1

Preparation of 1,5-bis(methylpiperidinium)pentane dibromide 50 g of 1,5-dibromopentane (0.22 mole, 99%, Alfa Aesar) was added to a 1 L flask containing 50 g of N-methylpiperidine (0.51 mole, 99%, Alfa Aesar) and 200 mL of ethanol. The reaction medium was stirred and heated under reflux for 5 h. The mixture was then cooled to ambient temperature and filtered. The mixture was poured into 300 mL of cold diethylether, then the precipitate formed was filtered and washed with 100 mL of diethylether. The solid obtained was recrystallized from an ethanol/ether mixture. The solid obtained was vacuum dried for 12 h. 75 g of a white solid was obtained (i.e. a yield of 80%).

The product had the expected $^1H$ NMR spectrum. $^1H$ NMR ($D_2O$, ppm/TMS): 1.29 (2H, q); 1.51 (4H, q); 1.70 (12H, m); 2.88 (6H, s); 3.19 (8H, t); 3.20 (4H, t).

EXAMPLE 2

Preparation of 1,5-bis(methylpiperidinium)pentane dihydroxide 18.9 g of $Ag_2O$ (0.08 mole, 99%, Aldrich) was added to a 250 mL Teflon beaker containing 30 g of 1,5-bis(methylpiperidinium)pentane dibromide (0.07 mole) and 100 mL of deionized water. The reaction medium was stirred, at 20° C., protected from light, for 12 h, The mixture was then filtered. The filtrate obtained was composed of an aqueous solution of 1,5-bis(methylpiperidinium)pentane dihydroxide. This species was assayed by proton NMR using formic acid as the standard.

EXAMPLE 3

Preparation of an IZM-3 Solid in Accordance with the Invention 3.530 g of a colloidal suspension of silica, known under the trade name Ludox AS-40 sold by Aldrich, was incorporated into a solution composed of 0.615 g of amorphous germanium oxide (Aldrich), 14.374 g of an aqueous solution of 30.9% by weight of 1,5-bis(methylpiperidinium)pentane dihydroxide, 0.745 g of an aqueous solution of 39.5% by weight hydrofluoric acid and 0.736 g of deionized water. The molar composition of the mixture was as follows: $0.8SiO_2$:$0.2GeO_2$:0.5R:0.5HF:$25H_2O$. The mixture was stirred vigorously for half an hour. Following homogenization, the mixture was transferred into an autoclave. The autoclave was heated for 10 days at 170° C. with stirring (200 rpm). The crystalline product obtained was filtered, washed with deionized water (to a neutral pH) then dried overnight at 100° C.

The solid as-synthesized product was analyzed by X ray diffraction and identified as being constituted by IZM-3 solid. The diffraction diagram for the as-synthesized IZM-3 solid is shown in FIG. 1.

EXAMPLE 4

Preparation of an IZM-3 Solid in Accordance with the Invention 3.156 g of a colloidal suspension of silica, known under the trade name Ludox AS-40 sold by Aldrich, was incorporated into a solution composed of 0.245 g of amorphous germanium oxide (Aldrich), 11.425 g of an aqueous solution of 30.9% by weight of 1,5-bis(methylpiperidinium)pentane dihydroxide, 0.592 g of an aqueous solution of 39.5% by weight hydrofluoric acid and 4.583 g of deionized water. The molar composition of the mixture was as follows: $0.9 SiO_2$:$0.1GeO_2$:0.5R:0.5HF:$35H_2O$. The mixture was stirred vigorously for half an hour. Following homogenization, the mixture was transferred into an autoclave. The autoclave was heated for 7 days at 170° C. with stirring (200 rpm). The crystalline product obtained was filtered, washed with deionized water (to a neutral pH) then dried overnight at 100° C.

The solid as-synthesized product was analyzed by X ray diffraction and identified as being constituted by IZM-3 solid. The diffraction diagram for the as-synthesized IZM-3 solid is shown in FIG. 1.

EXAMPLE 5

Preparation of an IZM-3 Solid in Accordance with the Invention 3.525 g of a colloidal suspension of silica, known under the trade name Ludox AS-40 sold by Aldrich, was incorporated into a solution composed of 11.485 g of an aqueous solution of 30.9% by weight of 1,5-bis(methylpiperidinium)pentane dihydroxide, 0.595 g of an aqueous solution of 39.5% by weight hydrofluoric acid and 4.395 g of deionized water. The molar composition of the mixture was as follows: $1SiO_2$:0.5R:0.5HF:$35H_2O$. The mixture was stirred vigorously for half an hour. Following homogenization, the mixture was transferred into an autoclave. The autoclave was heated for 7 days at 170° C. with stirring (200 rpm). The crystalline product obtained was filtered, washed with deionized water (to a neutral pH) then dried overnight at 100° C.

The solid as-synthesized product was analyzed by X ray diffraction and identified as being constituted by IZM-3 solid. The diffraction diagram for the as-synthesized IZM-3 solid is shown in FIG. 1.

The invention claimed is:

1. An IZM-3 crystalline solid with an Xray diffraction diagram including at least the peaks shown in the table below:

| 2 theta (°) | $d_{hkl}$ (Å) | $I_{rel}$ |
|---|---|---|
| 5.59 | 15.80 | Vs |
| 8.56 | 10.32 | Vw |
| 10.36 | 8.53 | Vw |
| 11.16 | 7.92 | Vw |
| 12.93 | 6.84 | Vw |
| 13.56 | 6.53 | Vw |
| 15.79 | 5.61 | Vw |
| 16.77 | 5.28 | Vw |
| 18.70 | 4.74 | Vw |
| 19.20 | 4.62 | Vw |
| 20.15 | 4.40 | Vw |
| 20.87 | 4.25 | Vw |
| 22.37 | 3.97 | W |
| 24.29 | 3.66 | Vw |
| 25.09 | 3.55 | Vw |
| 26.00 | 3.42 | Vw |
| 26.73 | 3.33 | Vw |
| 27.40 | 3.25 | Vw |
| 28.17 | 3.16 | Vw |
| 28.61 | 3.12 | Vw |
| 29.74 | 3.00 | Vw |
| 31.31 | 2.85 | Vw |
| 32.62 | 2.74 | Vw |
| 33.86 | 2.65 | Vw |
| 37.10 | 2.42 | Vw |
| 38.18 | 2.36 | Vw |
| 42.09 | 2.15 | Vw | in which:
Vs = very strong;
S = strong;
M = medium;
Mw = medium weak;
W = weak;
Vw = very weak, and having a chemical composition expressed as the anhydrous base in terms of moles of oxides defined by the following general formula: $aSiO_2$:$bYO_2$:cR:dF, in which Y is selected from germanium, titanium, tin and a mixture thereof, R is 1,5-bis(methylpiperidinium)pentane, and F is fluorine, a, b, c and d respectively representing the number of moles of $SiO_2$, $YO_2$, R and F and a is in the range of 0.1 to 1, b is in the range of above 0 to 0.9, c is in the range of 0.01 to 0.5 and d is in the range of 0 to 0.5.

2. An IZM-3 crystalline solid according to claim 1, in which Y is germanium.

3. An IZM-3 crystalline solid according to claim 1, in which a is in the range of 0.5 to 1.

4. An IZM-3 crystalline solid according to claim 1, in which b is in the range of 0.01 to 0.2.

5. An IZM-3 crystalline solid according to claim 1, in which c is in the range of 0.02 to 0.05.

6. An IZM-3 crystalline solid according to claim 1, in which d is in the range of 0.01 to 0.05.

7. A process for preparing an IZM-3 crystalline solid according to claim 1, comprising mixing, in an aqueous medium, at least one source of silicon, at least one source of at least one oxide $YO_2$, at least one organic nitrogen-containing species R comprising at least one quaternary nitrogen atom, at least one source of fluorine, then carrying out hydrothermal treatment of said mixture until said IZM-3 crystalline solid is formed.

8. A process for preparing an IZM-3 crystalline solid according to claim 7, in which the molar composition of the reaction mixture is:

$SiO_2/YO_2$: at least 0.1;
$H_2O/(SiO_2+YO_2)$: 1 to 100;
$R/(SiO_2+YO_2)$: 0.02 to 2;
$F/(SiO_2+YO_2)$: 0.01 to 4.

9. An IZM-3 crystalline solid according to claim 1, in which b is in the range of 0.01 to 0.2 and c is in the range of 0.02 to 0.05.

10. An IZM-3 crystalline solid according to claim 3, in which d is in the range of 0.01 to 0.05.

11. An IZM-3 crystalline solid according to claim 4, in which d is in the range of 0.01 to 0.05.

12. An IZM-3 crystalline solid according to claim 9, in which d is in the range of 0.01 to 0.05.

13. An IZM-3 crystalline solid according to claim 1 wherein d has a value above 0.

* * * * *

UNITED STATES PATENT AND TRADEMARK OFFICE
CERTIFICATE OF CORRECTION

PATENT NO. : 8,361,427 B2  Page 1 of 1
APPLICATION NO. : 12/744627
DATED : January 29, 2013
INVENTOR(S) : Fecant et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 337 days.

Signed and Sealed this
First Day of September, 2015

Michelle K. Lee
*Director of the United States Patent and Trademark Office*